United States Patent
Okamoto et al.

(10) Patent No.: US 9,511,649 B2
(45) Date of Patent: Dec. 6, 2016

(54) VIEW ADJUSTMENT DEVICE OF VEHICLE

(71) Applicant: MAZDA MOTOR CORPORATION, Hiroshima (JP)

(72) Inventors: Yoshihisa Okamoto, Hiroshima (JP);
Takahide Nouzawa, Hiroshima (JP);
Kazuo Nishikawa, Hiroshima (JP);
Atsuhide Kishi, Hiroshima (JP);
Takayoshi Nakamoto, Hiroshima (JP);
Naoki Yamada, Hiroshima (JP);
Hironobu Yonezawa, Hiroshima (JP);
Toshihiro Yoshida, Hiroshima (JP);
Hiroko Kajikawa, Hiroshima (JP);
Masaki Chiba, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 0 days.

(21) Appl. No.: 14/817,950

(22) Filed: Aug. 4, 2015

(65) Prior Publication Data
US 2016/0039271 A1 Feb. 11, 2016

(30) Foreign Application Priority Data
Aug. 8, 2014 (JP) ................................. 2014-162390

(51) Int. Cl.
*B60J 3/04* (2006.01)
*B60J 1/00* (2006.01)

(52) U.S. Cl.
CPC .. *B60J 1/002* (2013.01); *B60J 3/04* (2013.01)

(58) Field of Classification Search
CPC ............... B60J 1/002; B60J 3/02; B60J 3/007; B60J 3/0286; B60J 3/04; B60J 3/06
USPC .................. 296/96.19, 96.18, 97.7, 97.2
See application file for complete search history.

(56) References Cited

U.S. PATENT DOCUMENTS

| 4,555,434 A | * | 11/1985 | Kunert | B32B 17/10339 219/547 |
| 4,688,895 A | * | 8/1987 | Jacob | B60J 3/04 349/116 |
| 4,818,011 A | * | 4/1989 | Cherian | B60J 3/0208 296/97.2 |
| 7,284,782 B2 | | 10/2007 | Uenuma et al. | |
| 8,888,304 B2 | * | 11/2014 | Beckman | G02B 27/0101 296/97.2 |
| 2003/0151272 A1 | * | 8/2003 | Sugimoto | B60J 3/04 296/146.2 |

(Continued)

FOREIGN PATENT DOCUMENTS

| FR | 2864473 | * | 7/2005 |
| JP | 2-117413 | * | 5/1990 |

(Continued)

*Primary Examiner* — Dennis H Pedder
(74) *Attorney, Agent, or Firm* — Studebaker & Brackett PC (57) ABSTRACT

There are provided view adjustment areas respectively at an upper edge part, a lower edge part, and right-and-left side edge parts of a windshield glass, wherein the view adjustment areas are configured to be respectively switchable between in a transparent state in which forward visibility is ensured and in a translucent or non-transparent state in which the forward visibility is limited (for example, adhesion of a liquid-crystal film). Thereby, the size or the shape of the window-frame structure of the windshield glass which is physically unchangeable can be visually changed.

12 Claims, 7 Drawing Sheets

(56) References Cited

U.S. PATENT DOCUMENTS

| | | | | |
|---|---|---|---|---|
| 2004/0239141 A1* | 12/2004 | Iwao | ........................... | B60J 1/20 296/84.1 |
| 2005/0046222 A1* | 3/2005 | Ito | ............................. | B60J 3/04 296/96.19 |
| 2005/0280275 A1* | 12/2005 | Uenuma | ................... | B60R 1/00 296/84.1 |
| 2006/0158715 A1* | 7/2006 | Furusawa | ................. | B60J 3/04 359/265 |
| 2007/0102950 A1* | 5/2007 | Uematsu | ................... | B60J 1/02 296/96.19 |
| 2009/0058126 A1* | 3/2009 | Broude | ...................... | B60J 3/04 296/97.2 |
| 2014/0218664 A1* | 8/2014 | Nimura | ............ | G02F 1/133526 349/95 |
| 2015/0097389 A1* | 4/2015 | Dryselius | ................... | B60J 3/04 296/96.19 |

FOREIGN PATENT DOCUMENTS

| | | |
|---|---|---|
| JP | 2000-211355 A | 8/2000 |
| JP | 2005-075188 A | 3/2005 |

* cited by examiner

VIEW ADJUSTMENT DEVICE OF VEHICLE

BACKGROUND OF THE INVENTION

The present invention relates to a view adjustment device of a vehicle.

A driver in an automotive vehicle visually recognizes a front scene through a windshield glass. The windshield glass is respectively partitioned by a roof at its upper edge part, by a pair of right-and-left front pillars at its right-and-left edge parts, and by an instrument panel at its lower edge part, thereby forming a window-frame structure. Accordingly, the driver is influenced greatly by the widow frame structure. For example, this window-frame structure influences not only whether the forward visibility of the driver is appropriate or not but how the driver feels in terms of vehicle's speed feeling, vehicle's driving easiness or the like. U.S. Pat. No. 7,284,782 discloses a technology that a crest-shaped area where the forward visibility is limited is provided at the lower edge part of the windshield glass during a vehicle's turning in order to improve vehicle's turning feelings.

Meanwhile, since the roof, the right-and-left front pillars, and the instrument panel are fixed objects, a shape (contour) or size of the window frame of the windshield glass is fixed, not changeable. In general, however, a preferable window-frame structure (size or shape, in particular) changes greatly according to various kinds of driving conditions, traveling conditions and so on.

SUMMARY OF THE INVENTION

The present invention has been devised in view of the above-described matter, and an object of the present invention is to provide a view adjustment device of a vehicle which can visually change the size or the shape (contour) of the window-frame structure of the windshield glass which is physically fixed and unchangeable.

The present invention is a view adjustment device of a vehicle, comprising view adjustment areas which are respectively provided at an upper edge part, a lower edge part, and right-and-left side edge parts of a windshield glass, wherein the view adjustment areas are configured to be respectively switchable between in a transparent state in which forward visibility is ensured and in a translucent or non-transparent state in which the forward visibility is limited. According to the present invention, the window frame of the windshield glass is visually narrowed by providing an area (range) where the forward visibility is limited, so that the window-frame structure can be properly changed to a preferable one for the driver.

In an embodiment of the present invention, the view adjustment areas comprise an upper view adjustment area which extends in a vehicle width direction along the upper edge part of the windshield glass, a lower view adjustment area which extends in the vehicle width direction along the lower edge part of the windshield glass, and right-and-left view adjustment areas which respectively extend in a vertical direction along the right-and-left side edge parts of the windshield glass, a left end part of the upper view adjustment area and a left end part of the lower view adjustment area are configured to be continuous to each other via the left view adjustment area, and a right end part of the upper view adjustment area and a right end part of the lower view adjustment area are configured to be continuous to each other via the right view adjustment area, whereby the view adjustment areas are configured to have a closed ring-shaped area as a whole. According to this embodiment, the visual changing of the window-frame structure can be attained over an extremely large range. Thereby, the optimum window-frame structure can be provided so as to correspond to various situations, such as a vehicle traveling condition or a road condition.

In another embodiment of the present invention, the view adjustment areas are configured such that at least one of a transmittance or a color thereof is variable. According to this embodiment, the visual influence which the driver has can be changed from a broader perspective.

In another embodiment of the present invention, at least one of the view adjustment areas provided at the upper, lower, right, left side edge parts of the windshield glass is configured to selectively have a whole-part view limited state in which the forward visibility is limited in a whole part thereof and a partial-part view limited state in which the forward visibility is limited in a partial part thereof. According to this embodiment, a specified view adjustment area can be changed in the partial-part view limited state, not in the whole-part view limited state, which is preferable in properly setting the contour of the area where the forward visibility is limited.

In another embodiment of the present invention, a limited-visibility execution area which has the translucent or non-transparent state is determined according to at least one of a vehicle traveling condition, a road condition, and a visibility condition. According to this embodiment, the appropriate visual window-frame structure in accordance with the situations can be provided by properly responding to a change of the visual influence of the window-frame structure which the driver has according to the vehicle traveling condition or the like.

In another embodiment of the present invention, the view adjustment area provided at the upper edge part of the windshield glass which has the translucent or non-transparent state is configured to have a contour which protrudes downward the most at a central portion thereof in a vehicle width direction, a downward protrusion amount of which becomes gradually smaller toward an outward side from the central portion. According to this embodiment, an optical flow which is directed obliquely upward during the vehicle traveling is set along the area where the forward visibility is limited, which is preferable in improving driving exhilarating feeling for sleepiness prevention. Further, the forward visibility is limited in an upper area of the windshield glass which is not viewed by the driver very often, which is preferable in reducing dazzle or fatigue from dazzle.

In another embodiment of the present invention, the view adjustment area provided at the lower edge part of the windshield glass which has the translucent or non-transparent state is configured to have a contour which protrudes upward the most at a central portion thereof in a vehicle width direction, an upward protrusion amount of which becomes gradually smaller toward an outward side from the central portion. According to this embodiment, an optical flow which is directed obliquely downward during the vehicle traveling is set along the area where the forward visibility is limited, which is preferable in improving driving exhilarating feeling for sleepiness prevention. Further, it is restrained that the driver pays attention to a road area which is located near the vehicle, which is preferable in reducing driver's fatigue during a high-speed vehicle traveling, in particular.

In another embodiment of the present invention, the view adjustment area provided at the upper edge part of the windshield glass which has the translucent or non-transparent state is configured to have a contour which protrudes downward the most at a central portion thereof in a vehicle width direction, a downward protrusion amount of which becomes gradually smaller toward an outward side from the central portion, the view adjustment area provided at the lower edge part of the windshield glass which has the translucent or non-transparent state is configured to have a contour which protrudes upward the most at a central portion thereof in a vehicle width direction, an upward protrusion amount of which becomes gradually smaller toward an outward side from the central portion, and the above-described view adjustment area provided at the upper edge part of the windshield glass and having the translucent or non-transparent state configured to have the contour protruding downward the most at the central portion in the vehicle width direction and the above-described view adjustment area provided at the lower edge part of the windshield glass and having the translucent or non-transparent state configured to have the contour protruding upward the most at the central portion in the vehicle width direction are created concurrently on the windshield glass. This embodiment can enhance the effects of the above-described last two embodiments.

In another embodiment of the present invention, the view adjustment areas provided at the right-and-left side edge parts of the windshield glass which have the translucent or non-transparent state are respectively configured to have a contour which protrudes inward in a vehicle width direction from a front pillar, an inward protrusion amount of which becomes gradually larger toward an upward side, and an inward edge portion of which extends substantially vertically in the windshield glass. This embodiment is preferable in adding a near scene or compensating depth perception (perspective). Further, the optical flow is rectified such that it is shielded with an angle which is close to a perpendicular angle, which is preferable in improving a forward attention, in particular, in improving a sense of stability in the high-speed vehicle traveling.

In another embodiment of the present invention, a boundary area between the view adjustment areas provided at the lower edge part and the right or left side edge parts of the windshield glass which has the translucent or non-transparent state is configured to have, at a lower corner portion of the windshield glass beside a front pillar, a contour which curves substantially in an arc shape, being concaved toward the corner portion, and a radius of curvature of the substantially arc-shaped contour is configured to be changeable. This embodiment is preferable in preventing a sense of flickering which is caused by changing of an external (peripheral) environment which appears to flow in at the boundary area during the vehicle traveling.

In another embodiment of the present invention, the view adjustment area provided at the lower edge part of the windshield glass which has the translucent or non-transparent state is configured to have a contour which is of a crest shape so as to cover over a meter hood provided in front of a driver's seat. This embodiment is preferable in adding the near scene or compensating the depth perception.

In another embodiment of the present invention, the view adjustment area provided at the lower edge part of the windshield glass which has the translucent or non-transparent state is configured to have a contour which comprises at least two split parts, a split position of the two split parts, when viewed from the driver, being configured to match a position where a road white line flows in during a vehicle traveling. This embodiment is preferable in giving the driver a sense of safety that the vehicle travels along the road white line stably.

In another embodiment of the present invention, a range of the windshield glass where the forward visibility is limited, which is determined by the view adjustment areas in the translucent or non-transparent state, is configured to be automatically set. This embodiment is preferable in saving the driver the trouble and making the driver pay attention to the driving.

In another embodiment of the present invention, a range of the windshield glass where the forward visibility is limited, which is determined by the view adjustment areas in the translucent or non-transparent state, is configured to be manually selectable. According to this embodiment, the range which the driver likes can be the view adjustment area.

Other features, aspects, and advantages of the present invention will become apparent from the following description which refers to the accompanying drawings.

DETAILED DESCRIPTION OF THE INVENTION

Figure 1:
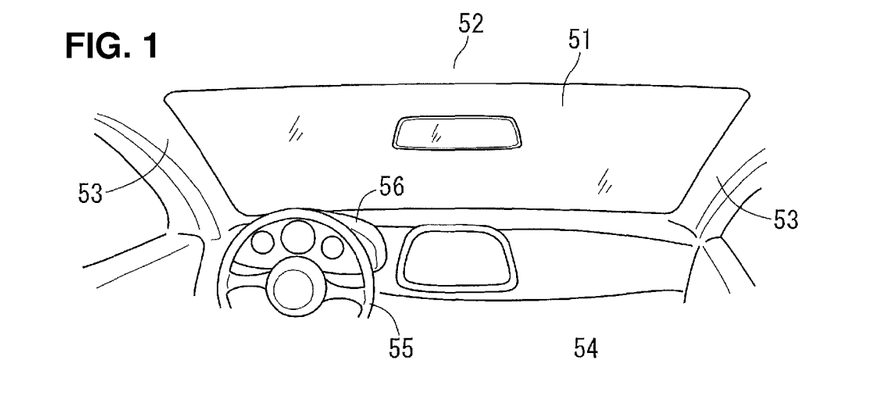
FIG. 1 is a view of a windshield glass of a vehicle, to which the present invention is applied, when viewed from an inside of a vehicle compartment.

In FIG. 1, reference character 51 denotes a windshield glass. The windshield glass 51 is respectively partitioned by a roof 52 at its upper edge part, partitioned by a pair of right-and-left front pillars 53 at its right-and-left side edge parts, and portioned by an instrument panel 54 at its lower edge part. Thus, a window-frame structure of the windshield glass 51 is configured to be partitioned by the roof 52, the pair of right-and-left front pillars 53, and the instrument panel 54, which is a fixed, unchangeable structure. The window-frame structure is generally of an inverse-trapezoidal shape. A driver has a visual influence from a size and shape (contour) of the partitioned window-frame structure. In FIG. 1, reference character 55 denotes a steering wheel, which is installed to the left side of the vehicle in the present embodiment.

Figure 2:
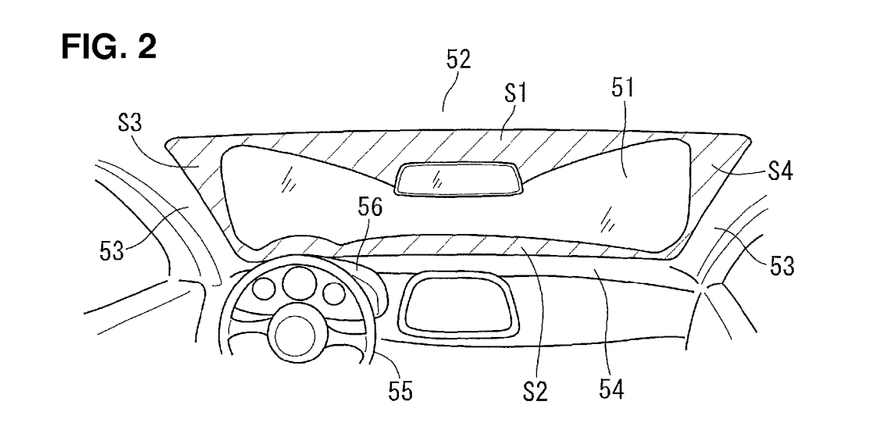
FIG. 2 is a view showing an example of setting view adjustment areas, which corresponds to FIG. 1.

As shown in FIG. 2, a hutching area is set (provided) at the windshield glass 51 as an area where the forward visibility is limited. This area where the forward visibility is limited can be created by a color type liquid-crystal film adhering to the hutching area, for example. Herein, by adjusting an energizing state of this film, the area where the forward visibility is limited is configured to be switchable between in a transparent state in which the forward visibility is ensured and in a translucent or non-transparent state in which the forward visibility is limited. That is, FIG. 1 shows a state in which the forward visibility is ensured at a whole part of the windshield glass 51, and FIG. 2 shows a state in which the forward visibility is limited at a maximum-area range of the windshield glass 51.

The above-described area where the forward visibility is limited is formed in a ring shape as a whole such that it encloses a whole peripheral edge portion of the windshield glass 51. More specifically, there are provided an upper view limitation area S1 which extends in a vehicle width direction along an upper edge of the windshield glass 51, a lower view limitation area S2 which extends in the vehicle width direction along a lower edge of the windshield glass 51, and right-and-left side view limitation areas S3, S4 which respectively extend in a vertical direction along inner edges of the right-and-left front pillars 53. Both-side end portions of the upper and lower view limitation areas S1, S2 are respectively interconnected by the right-and-left view limitation areas S3, S4. Hereinafter, reference character "S" will be simply used to describe the respective view limitation areas S1-S4 in some case in which it is unnecessary to differentiate these areas S1-S4 from each other.

The above-described view limitation areas S1-S4 are configured to have a transparent state in which the forward visibility is ensured by an energization cut (i.e., a power-supply stop). Meanwhile, these view limitation areas S1-S4 are configured to change a transmittance or a color thereof by adjusting an energizing state when the power (electricity) is supplied thereto. For example, the transmittance of each of the view limitation areas S1-S4 is adjustable within a range of 0-60%, and the color thereof is adjustable among black, gray, green, and blue.

While FIG. 2 shows the state of the view limitation areas S1-S4 where the forward visibility is limited in the maximum-area range, the forward visibility of these areas S1-S4 can be adjusted partially. This partial adjustment state is shown in FIGS. 3-7, which is apparently different from FIG. 2.

Figure 3:
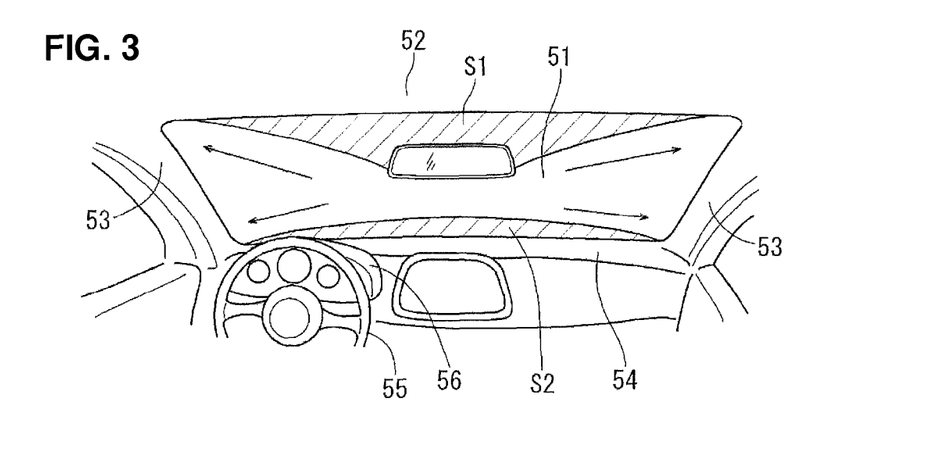
FIG. 3 is a view showing a first example in a case in which the forward visibility is limited by the view adjustment areas from a state shown in FIG. 1.

Next, preferable examples of the view limitation state will be described. First, FIG. 3 shows a state in which the forward view is limited by using the upper and lower view limitation areas S1, S2 (no forward-view limitation by the view limitation areas S3, S4). In FIG. 3, the upper view limitation area S1 where the forward visibility is limited is configured to have a contour which protrudes downward the most at a central portion thereof in the vehicle width direction, a downward protrusion amount of which becomes gradually smaller toward an outward side from the central portion in a substantially straight shape. Further, the lower view limitation area S2 where the forward visibility is limited is configured to have a crest-shaped contour which protrudes upward the most at the central portion thereof in the vehicle width direction, an upward protrusion amount of which becomes gradually smaller toward the outward side from the central portion in a gentle curve shape. According to this setting shown in FIG. 3, an optical flow (a flowing direction of the front scene which the driver visually recognizes during the vehicle traveling) which is directed obliquely upward as shown by an arrow is configured along the upper view limitation contour and an optical flow which is directed obliquely downward as shown by an arrow is configured along the lower view limitation contour during a high-speed vehicle traveling, in particular, which is preferable in improving driving exhilarating feeling or preventing sleepiness.

The contour setting (providing) of the lower view limitation area S2 shown in FIG. 3 restrains that the driver pays attention to the road area near the vehicle during the high-speed vehicle traveling, in particular, which is preferable in reducing driver's fatigue. Further, the contour setting of the upper view limitation area S1 shown in FIG. 3 shuts off an upper view area of the windshield glass which is not viewed by the driver very often, therefore may be unnecessary, which is preferable in reducing dazzle or fatigue from dazzle. Herein, the transmittance of the view limitation areas S1, S2 may be configured to be gradually changeable such that the transmittance becomes lower toward the outer peripheral portion of the windshield glass 51, for example (the transmittance may be configured to be constant in the whole part, of course). Further, the transmittance may be configured such that it is relatively low in fine weather (increasing the view limitation degree) but relatively high when the outside is dark in cloudy weather or the like. Likewise, the color of the view limitation area may be configured to be changeable. For example, dark-based colors, such as black, may be used in the fine weather, and bright colors, such as blue, may be used in the cloudy weather or the like. Of course, the depth of a color may be configured to be changeable such that it becomes deeper toward the outer peripheral portion of the windshield glass 51, for example.

Figure 4:
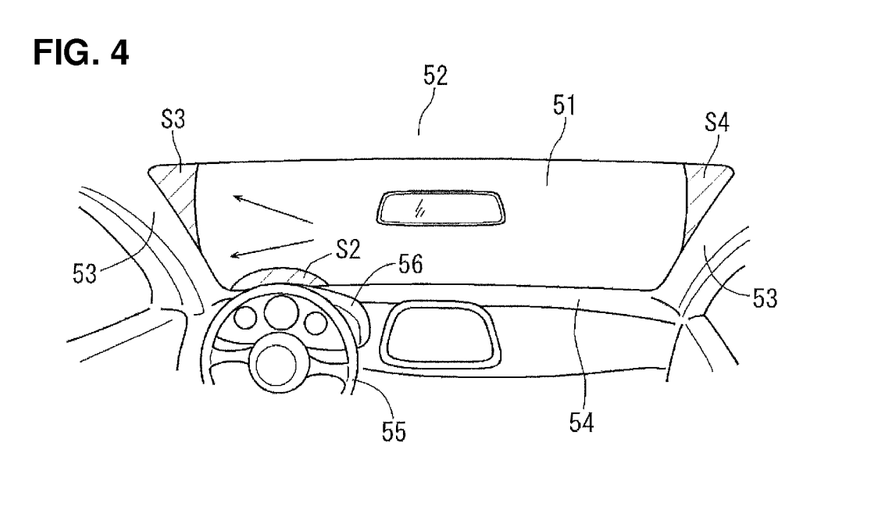
FIG. 4 is a view showing a second example in a case in which the forward visibility is limited by the view adjustment areas from the state shown in FIG. 1.

FIG. 4 shows a pair of roughly triangular-shaped areas where the forward visibility is limited, which are formed at right-and-left upper corner portions of the windshield glass 51 by using the right-and-left view limitation areas S3, S4 which are respectively configured to have a contour which protrudes inward in the vehicle width direction from the front pillar 53, an inward protrusion amount of which becomes gradually larger toward an upward side. Herein, an inward edge portion of each of the above-described roughly triangular-shaped areas is configured to extend substantially vertically in the windshield glass. Setting as shown in FIG. 4 is preferable in adding the near scene or compensating the depth perception (perspective). Further, the optical flow shown by arrows is rectified such that it is shielded with an angle which is close to a perpendicular angle relative to the upper end portion and the lower end portion of the front pillar 53 which is positioned closer to a driver's seat, which is preferable in improving the forward attention, in particular, in improving the sense of stability in the high-speed vehicle traveling.

FIG. 4 further shows another area where the forward visibility is limited, which is formed in front of a steering wheel 5 by using the lower view limitation area S2 which is configured to have a contour which is of a small crest shape so as to cover over a meter hood 6 provided at an instrument panel 4. This is preferable in adding the near scene or compensating the depth perception.

Figure 5:
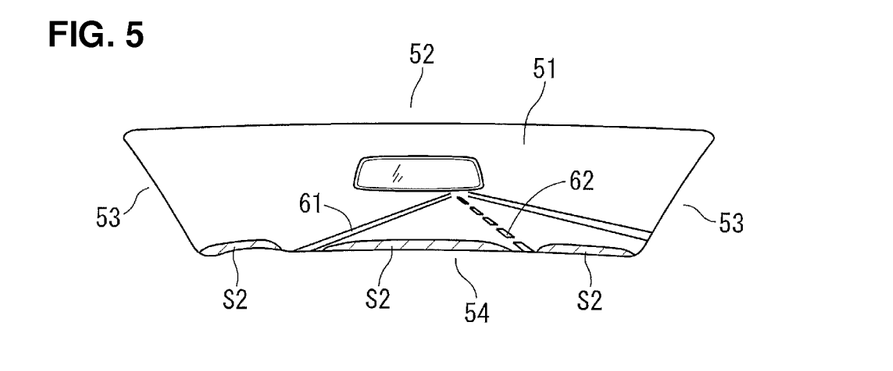
FIG. 5 is a view showing a third example in a case in which the forward visibility is limited by the view adjustment areas from the state shown in FIG. 1.

FIG. 5 shows the lower view limitation area S2 which is configured to have a contour which comprises three split parts, split positions of the three split parts, when viewed from the driver, being configured to match two positions where road white lines 61, 62 flow in during the vehicle traveling. That is, a specified part of the windshield glass 51 near the instrument panel 4 where the white line 61 which is put on a left end of a road and the white line (dotted line) 62 which is a separation line to separate the road into left and right parts flow in during the vehicle traveling is configured to be an area where the forward visibility is not limited, and the other part is configured to be another area where the forward visibility is limited. In an example shown in FIG. 5, the contour of the area where the forward visibility is limited is configured such that its upward protrusion amount is relatively small and substantially constant over a whole length in the vehicle width direction. Setting as shown in FIG. 5 is preferable in giving the driver a sense of safety that the vehicle travels along the road while lines 61, 62 stably. The example shown in FIG. 5 is preferable when the vehicle travels on a straight road, including a gentle curve, of an express highway, in particular.

Figure 6:
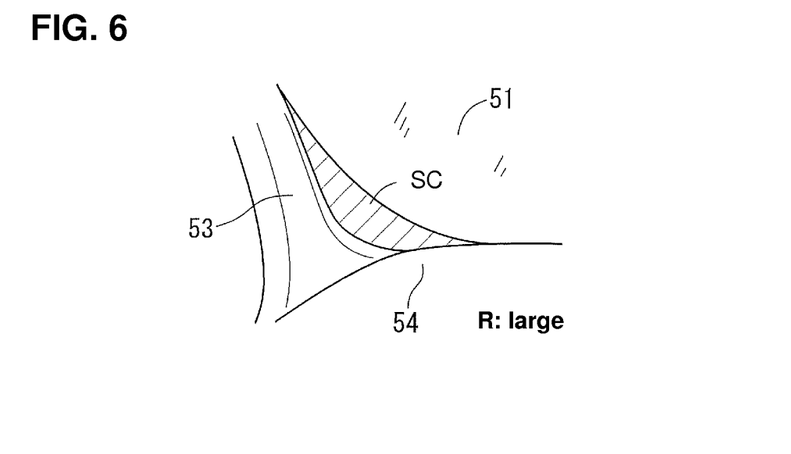
FIG. 6 is a view showing a fourth example in a case in which the forward visibility is limited by the view adjustment areas from the state shown in FIG. 1.
Figure 7:
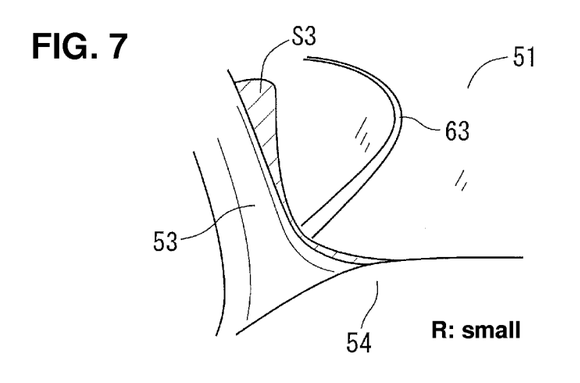
FIG. 7 is a view showing a fifth example in a case in which the forward visibility is limited by the view adjustment areas from the state shown in FIG. 1.
Figure 8:
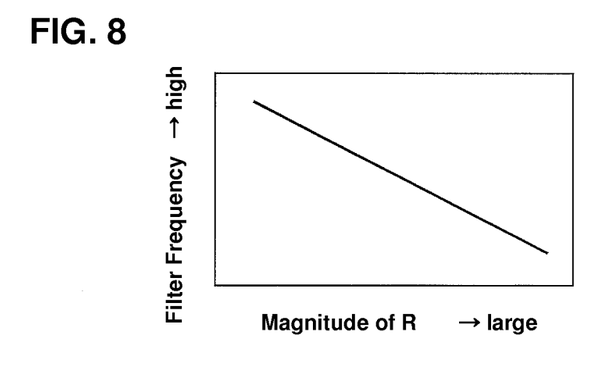
FIG. 8 is characteristics showing a relationship of a radius of curvature and a filter frequency of an area where the forward visibility is limited.

FIGS. 6 and 7 show examples in which the radius of curvature of a corner portion of the windshield glass 51 at a lower portion of the front pillar 53 on the driver side is visually changeable. That is, a boundary area SC between the lower view limitation area S2 and the right-and-left side view limitation areas S3, S4 (which corresponds to the above-described corner portion) is configured to have a contour which curves substantially in an arc shape, being concaved toward the corner portion. FIG. 6 shows a case in which a radius of curvature R is large, and FIG. 7 shows another case in which the radius of curvature R is small. Setting of the radius of curvature R is preferable in restraining a sudden change of an external (peripheral) environment viewed by the driver, thereby preventing a so-called sense of flickering. For example, the driver may view a scene that the road while line 63 appears to flow in at the corner portion as shown in FIG. 7 when the vehicle travels on a curve road, which is preferable in preventing the sense of flickering. The case in which the radius of curvature R is small has a filter effect of cutting high frequency, and the case in which the radius of curvature R is large has a filter effect of cutting low frequency. Herein, a relationship of the radius of curvature R and the above-described filter frequency is shown in FIG. 8.

Figure 9:
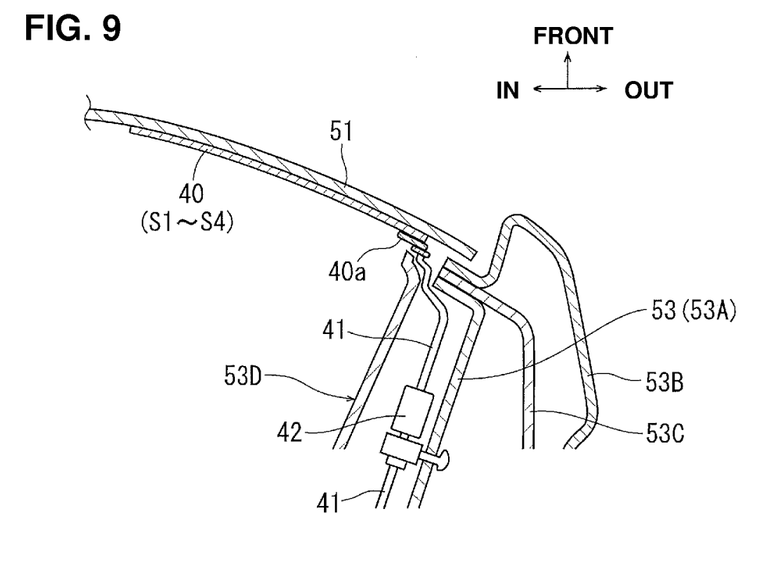
FIG. 9 is a major-part sectional view showing a structural example of a power supply portion for an electric display film which forms the area where the forward visibility is limited.

FIG. 9 shows a structural example of a power supply portion for an electric display film 40 which creates the above-described view limitation areas S1-S4. The embodiment is configured such that the power (electricity) is supplied from a portion of the front pillar 53. That is, the front pillar 53 is configured to have a closed cross section which is formed by a pillar inner 53A and a pillar outer 53B and reinforced by a reinforcement 53C. Further, a pillar trim 53D is arranged on an inside of the pillar inner 53A. A wire harness for power supply 41 is coupled to an electrode 40a of the display film 40, and this wire harness 41 is arranged through a gap between the pillar inner 53A and the pillar trim 53D. Further, a connecting coupler 42 is provided at a midway position of the wire harness 41, and this connecting coupler 42 is supported at the pillar inner 53A. Herein, any type of electric display film which has been materialized is applicable.

Figure 10:
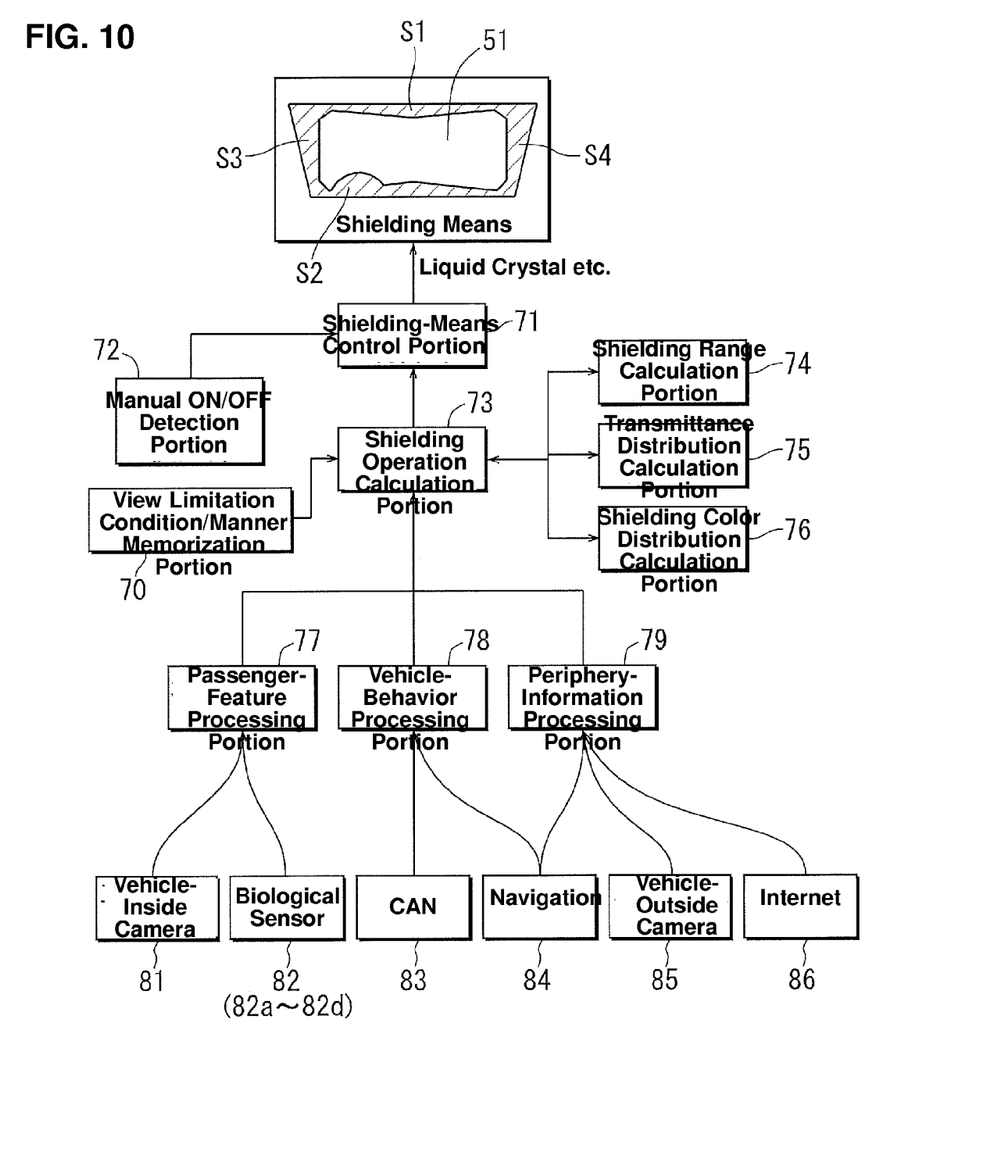
FIG. 10 is a diagram showing a control system of the present invention.
Figure 11:
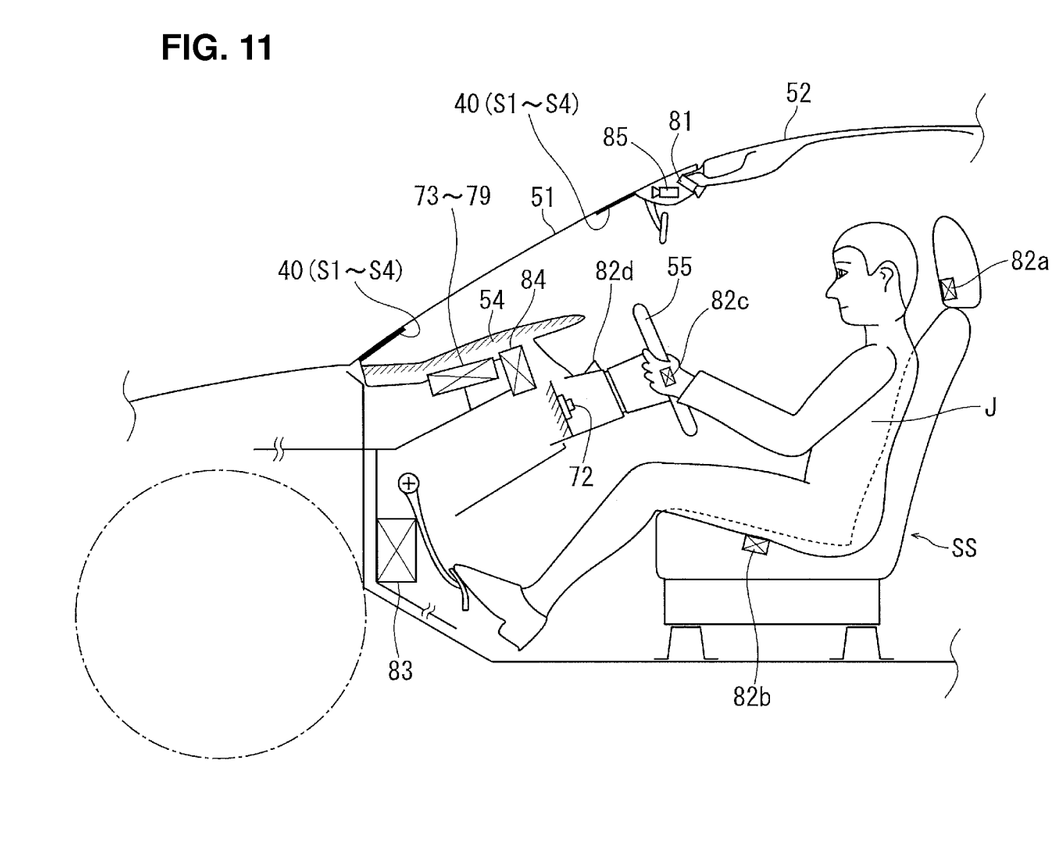
FIG. 11 is a schematic side view showing an arrangement example of sensors, devices and others which are shown in FIG. 10.

FIG. 10 shows an example of a control system or the like to execute the view-limitation control by the view limitation areas S1-S4 described above. FIG. 11 shows an arrangement example of sensors, devices and others which are shown in FIG. 10.

In FIG. 10, a shielding-means control portion 71 is configured to execute a power-supply control to the above-described display film 40 (see FIG. 9) which generates the view limitation areas S1-S4, and output control signals according to the view limitation execution areas, the transmittance, the color, and so on. A manual ON/OFF detection portion 72 is manually operated by the driver for selection of execution of the view limitation or non-execution (when OFF is selected, the view limitation is not performed at all).

A shielding operation calculation portion 73 is configured to exchange information with respective calculation portions 74-76 and input respective signals from processing portions 77-79. The range where the forward visibility is limited is calculated (obtained) by the shielding range calculation portion 74. The transmittance and its distribution are calculated by the transmittance distribution calculation portion 75. The color and its distribution of the view limitation portion are calculated by the shielding color calculation portion 76. The calculation of the calculation portions 74-76 is executed by the shielding operation calculation portion 73 based on the information from the processing portions 77-79. Further, information memorized at a view-limitation condition/manner memorization portion 70 is inputted to the shielding operation calculation portion 73. The view-limitation condition/manner memorization portion 70 is configured to memorize many preferable setting examples (combination examples) of the view limitation areas S1-S4 which are previously obtained through a simulation according to conditions/manners, such as the vehicle outside situation, the features of passengers, the vehicle situation.

The passenger-feature processing portion 77 is configured to calculate a passenger feature based on signals from a vehicle-inside camera 81 to take a picture inside the vehicle and a biological sensor 82 (through detections of a passenger's body size, a brain's performance, and a direction of passenger's eyes; see FIG. 11 as well). The vehicle-inside camera 81 detects a body size and an eyes' position (eye point) of a passenger J seated in a driver's seat SS. In the embodiment, as shown in FIG. 11, the biological sensor 82 comprises a non-contact type brain-wave sensor 82a to detect the brain wave of the passenger J, a bloodstream sensor 82b to detect the bloodstream of a femur of the passenger J, a bloodstream sensor 82c to detect the bloodstream of a finger of the passenger J (which is built in at the steering wheel 55), and a microphone 82d to gather the voice of the passenger J (to estimate passenger's feelings).

The vehicle-behavior processing portion 78 inputs vehicle information, such as a vehicle speed, a vehicle acceleration, a lateral G (lateral acceleration), and steering angle, by way of a CAN 83 which is a vehicle communication network. The vehicle-behavior processing portion 78 further inputs, from a navigation device 84, information relating to a road on which the vehicle currently travels (for example, information of an express highway, a street road, a straight road, a curve road, an uphill road, a downhill road or the like, and traffic information relating to a traffic jam or the like). The periphery-information processing portion 79 inputs various kinds of information (traffic information, such as the traffic jam, and the like) from a vehicle-outside camera 85 to take a picture in front of the vehicle and an internet 86.

The above-described various kinds of information are used for calculations of the above-described respective calculation portions 73-76, and results of the calculations are integrated at the shielding operation calculation portion 73 and outputted to the shielding-means control portion 71. Based on the control signal of the shielding-means control portion 71, the view-limitation range is set as shown in FIG. 3, for example, and also the transmittance and its distribution and the color and its distribution of this view-limitation range are set (executed). The shielding operation calculation portion 73 calculates the preferable view limitation areas S1-S4 by comparing the current situation obtained by the processing portions 77-79 with the memorized contents of the view-limitation condition/manner memorization portion 70.

Herein, the calculation portions 74-76 may be omitted, and the preferable view limitation areas S1-S4 may be set based on only the memorized information which is obtained through the simulation memorized at the view-limitation condition/manner memorization portion 70 (the preferable setting information of the view limitation area). On the contrary, the view-limitation condition/manner memorization portion 70 may be omitted, and the view limitation areas S1-S4 may be set based on only the calculation results of the calculation portions 74-76.

Figure 12:
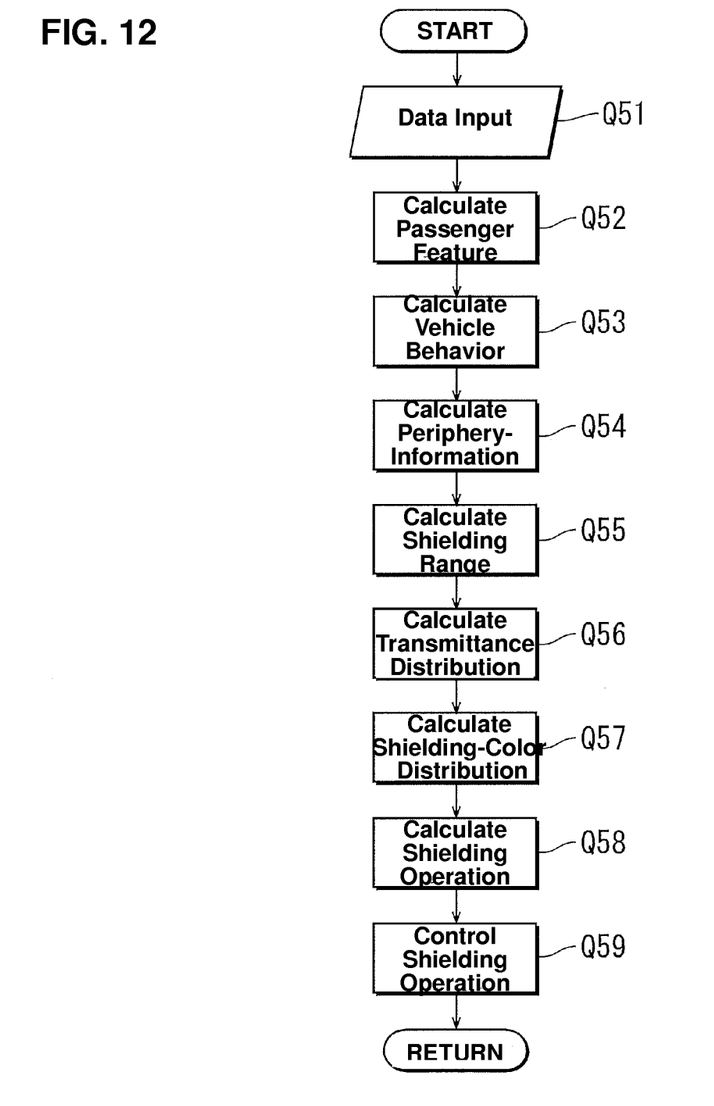
FIG. 12 is a flowchart showing a control example of the present invention.

Hereafter, a control example by the control system and the like shown in FIG. 10 will be described referring to a flowchart of FIG. 12. Herein, reference character Q denotes a control step. First, in step Q51, respective signals from the devices 81-86 are inputted, then the processing at the respective processing portions 77-79 are executed in steps Q52-Q54 (the eye point of the passenger is detected by the passenger-feature processing portion 77 as well). Next, the calculations at the respective calculation portions 74-76 are executed in steps Q55-Q57. After these, the calculation at the shielding operation calculation portion 73 is executed in step Q58. The control at the shielding-means control portion 71 according to the calculation results of the step Q58 is executed in the next step Q59.

Figure 13:
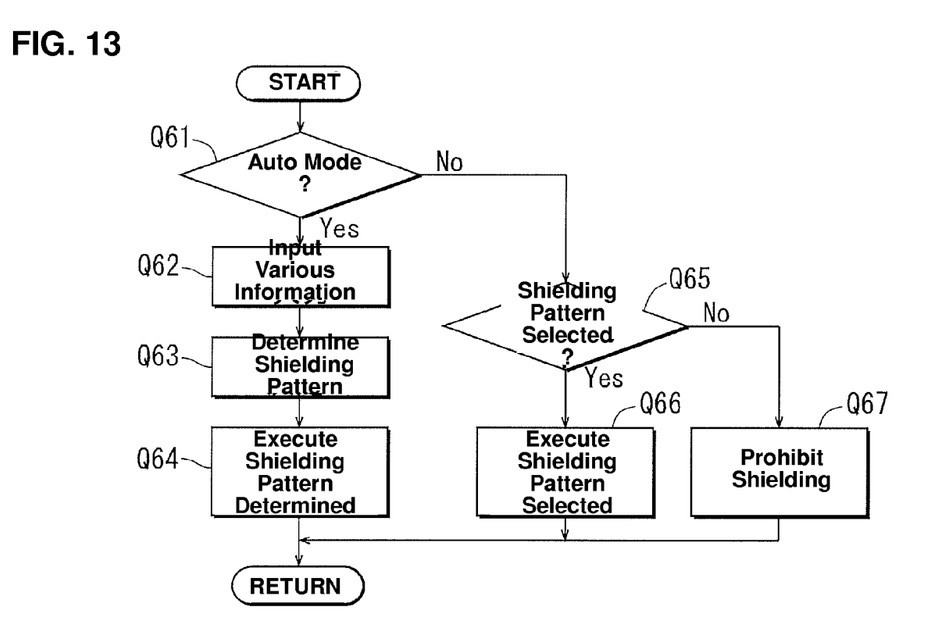
FIG. 13 is a flowchart showing a second control example of the present invention.

FIG. 13 shows a control example in which the view limitation by an auto mode which is manually selected is executed, and the area, the contour and the like of the view limitation is selected manually. Herein, a manual mode is configured such that any one of the settings shown in FIGS. 3, 4, 5 and others or any combination of these plural settings are selectable.

In FIG. 13, it is judged in step Q61 whether or not the auto mode is selected. When the judgment of the step Q61 is YES, processing of steps Q62-Q64 are executed. That is, the respective output information are inputted in the step Q62 (corresponding to the processing of the step Q51 in FIG. 12), a shielding pattern is determined in the step Q63 (corresponding to the processing of the steps Q53-Q58 in FIG. 12), and a control is executed such that the view limitation area has the pattern determined in the step Q63 (corresponding to the processing of the step Q59 in FIG. 12).

When the judgment of the step Q61 is NO, it is judged in step Q65 whether or not the shielding pattern is selected. When the judgment of the step Q65 is YES, the view-limitation control is executed in step Q66 such that the view limitation has the selected pattern. When the judgment of the step Q65 is NO, the view limitation is unnecessary, so the view-limitation control is prohibited in step Q67.

Herein, it is preferable that appropriate settings of the view limitation area, the size or the contour of the view limitation area, the transmittance, the color or the like according to any one of a vehicle traveling condition (vehicle condition), a road condition, a vehicle periphery condition, a view filed condition (distinction of nighttime, daytime, rainy weather, fine weather, cloudy weather, or the like) and the like, for example, or any combination of these plural conditions be previously memorized at a memory, and the view-limitation control be executed based on the appropriate settings which are read out from the memory, corresponding to the current vehicle traveling condition, road condition and the like. Further, in a case in which the view limitation and the like are selected by the manual selection, it is preferable that appropriate view limitation examples preferably selectable according to situations be indicated or illustrated in a vehicle's user manual or the like.

The appropriate view limitation according to the vehicle traveling condition, the road condition and the like can be determined through a simulation by using a driving simulator, for example, and simulation results can be memorized at the above-described view-limitation condition/manner memorization portion 70. Herein, it is preferable that the simulation be executed considering the bran wave and the bloodstream additionally and the simulation results be used as the information for the view limitation.

The present invention should not be limited to the above-described embodiment, and any other modifications or improvements may be applied within the scope of a spirit of the present invention. For example, the above-described setting of the view limitation area can execute by any means, such as a head up display. Of course, the object of the present invention should not be limited to the one explicitly described, but implicitly includes anything which may be substantially indicated as an appropriate matter or advantage.

What is claimed is:

1. A view adjustment device of a vehicle, comprising:
view adjustment areas which are respectively provided at an upper edge part and a lower edge part of a windshield glass, wherein
said view adjustment areas comprise an upper view adjustment area which extends in a vehicle width direction along the upper edge part of the windshield glass, and a lower view adjustment area which extends in the vehicle width direction along the lower edge part of the windshield glass,
said upper view adjustment area at the upper edge part protrudes downwardly from the upper edge part, and angles upwardly from the downwardly protruding portion as said upper view adjustment area approaches a left edge part of the windshield glass and angles upwardly from the downwardly protruding portion as said upper view adjustment area approaches a right edge part of the windshield glass,
the lower view adjustment area at the lower edge part protrudes upwardly from the lower edge part, and angles downwardly from the upwardly protruding portion as the lower view adjustment area approaches the left edge part of the windshield glass and angles downwardly from the protruding portion as the lower view adjustment area approaches a right edge part of the windshield glass, and
the view adjustment areas are configured to be respectively switchable between a transparent state in which forward visibility is ensured and a translucent or non-transparent state in which the forward visibility is limited.

2. The view adjustment device of the vehicle of claim 1, wherein said upper view adjustment area terminates a spaced distance from the left edge part and terminates a spaced distance from the right edge part.

3. The view adjustment device of the vehicle of claim 1, wherein said view adjustment areas are configured such that at least one of a transmittance or a color thereof is variable.

4. The view adjustment device of the vehicle of claim 1, wherein at least one of said view adjustment areas provided at the upper and lower edge parts of the windshield glass is configured to selectively have a whole-part view limited state in which the forward visibility is limited in a whole part thereof and a partial-part view limited state in which the forward visibility is limited in a partial part thereof.

5. The view adjustment device of the vehicle of claim 1, wherein a limited-visibility execution area which has said translucent or non-transparent state is determined according to at least one of a vehicle traveling condition, a road condition, and a visibility condition.

6. A view adjustment device of a vehicle comprising:
a left view adjustment area extending from a left side edge part to an upper edge part; and
a right view adjustment area extending from a right side edge part to the upper edge part; wherein
the view adjustment areas are configured to be respectively switchable between a transparent state in which forward visibility is ensured and in a translucent or non-transparent state in which the forward visibility is limited, and
the left view adjustment area and the right view adjustment area each have said translucent or non-transparent state respectively configured to have a contour which protrudes inward in a vehicle width direction from a front pillar, an inward protrusion amount of which becomes gradually larger toward an upward side, and an inward edge portion of which extends substantially vertically in the windshield glass.

7. A vehicle comprising:
a windshield glass;
a lower edge part;
a left edge part;
a right edge part;
a first view adjustment area positioned to extend from the lower edge part to the left edge part; and
a second view adjustment area positioned to extend from the lower edge part to the right edge part; wherein
the first and second view adjustment areas are configured to be respectively switchable between a transparent state in which forward visibility is ensured and in a translucent or non-transparent state in which the forward visibility is limited,
each of the first view adjustment area and the second view adjustment area includes a contour that includes a changeable radius,
a first radius of each changeable radius is configured to form a first contour which curves substantially in an arc shape extending from the lower edge part to a respective one of the left edge part and the right edge part,
a second radius of each changeable radius is configured to form a second contour that protrudes inwardly in a vehicle width direction from a front pillar, and
each changeable radius is configured to change from the first contour to the second contour.

8. The view adjustment device of the vehicle of claim 1, wherein the view adjustment area provided at the lower edge part of the windshield glass which has said translucent or non-transparent state is configured to have a contour which is of a curvilinear shape so as to cover over a meter hood provided in front of a driver's seat.

9. A view adjustment device of a vehicle, comprising:
a plurality of curvilinear view adjustments areas provided across a lower edge part of a windshield glass and positioned a spaced distance from adjacent curvilinear view adjustment areas of the plurality of curvilinear view adjustment areas, at least one of the plurality of curvilinear view adjustment areas having a first end and a second end, and each of the first end and the second end terminate at the lower edge part; wherein
each of the plurality of curvilinear view adjustment areas is configured to be respectively switchable between a transparent state in which forward visibility is ensured and a translucent or non-transparent state in which the forward visibility is limited.

10. The view adjustment device of the vehicle of claim 1, wherein a range of the windshield glass where the forward visibility is limited, which is determined by the view adjustment areas in said translucent or non-transparent state, is configured to be automatically set.

11. The view adjustment device of the vehicle of claim 1, wherein a range of the windshield glass where the forward visibility is limited, which is determined by the view adjustment areas in said translucent or non-transparent state, is configured to be manually selectable.

12. The view adjustment device of claim 9, wherein at least one spaced distance between adjacent curvilinear view adjustments areas matches a position where a road line marked on a road flows during travel of the vehicle when the curvilinear view adjustment areas are viewed from a driver of the vehicle.

* * * * *